United States Patent Office 3,229,285
Patented Jan. 11, 1966

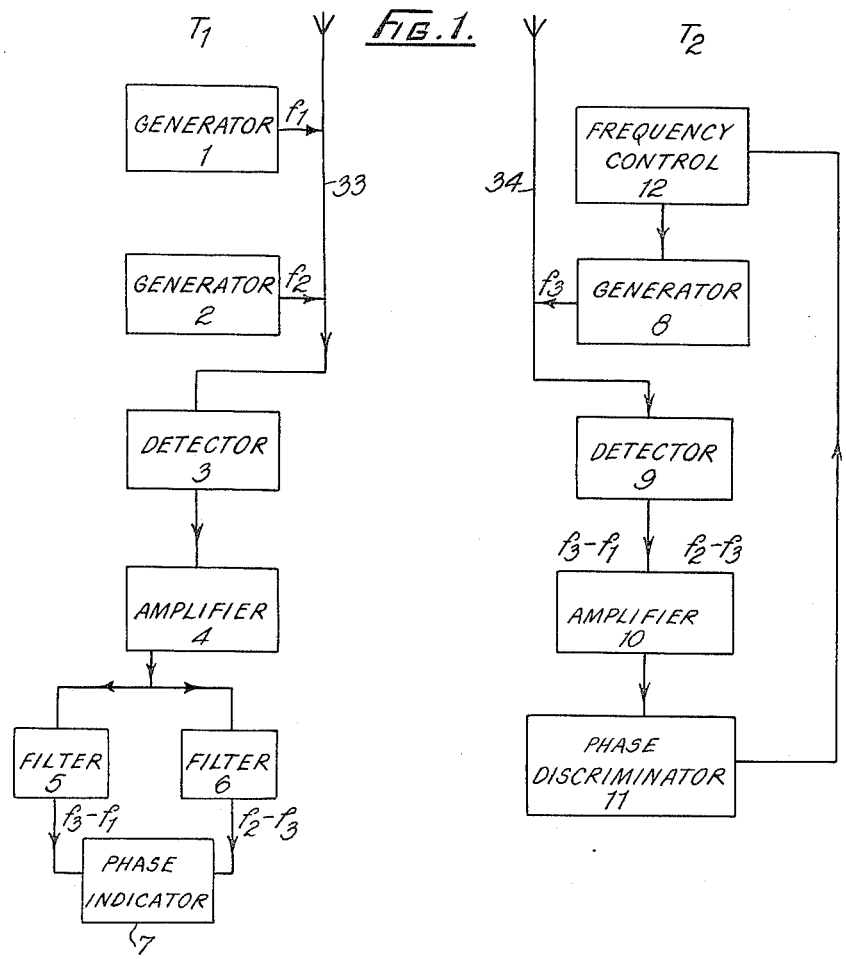
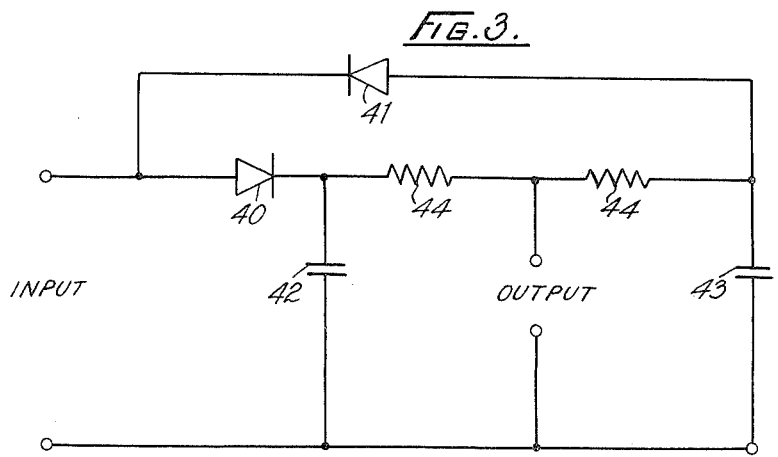

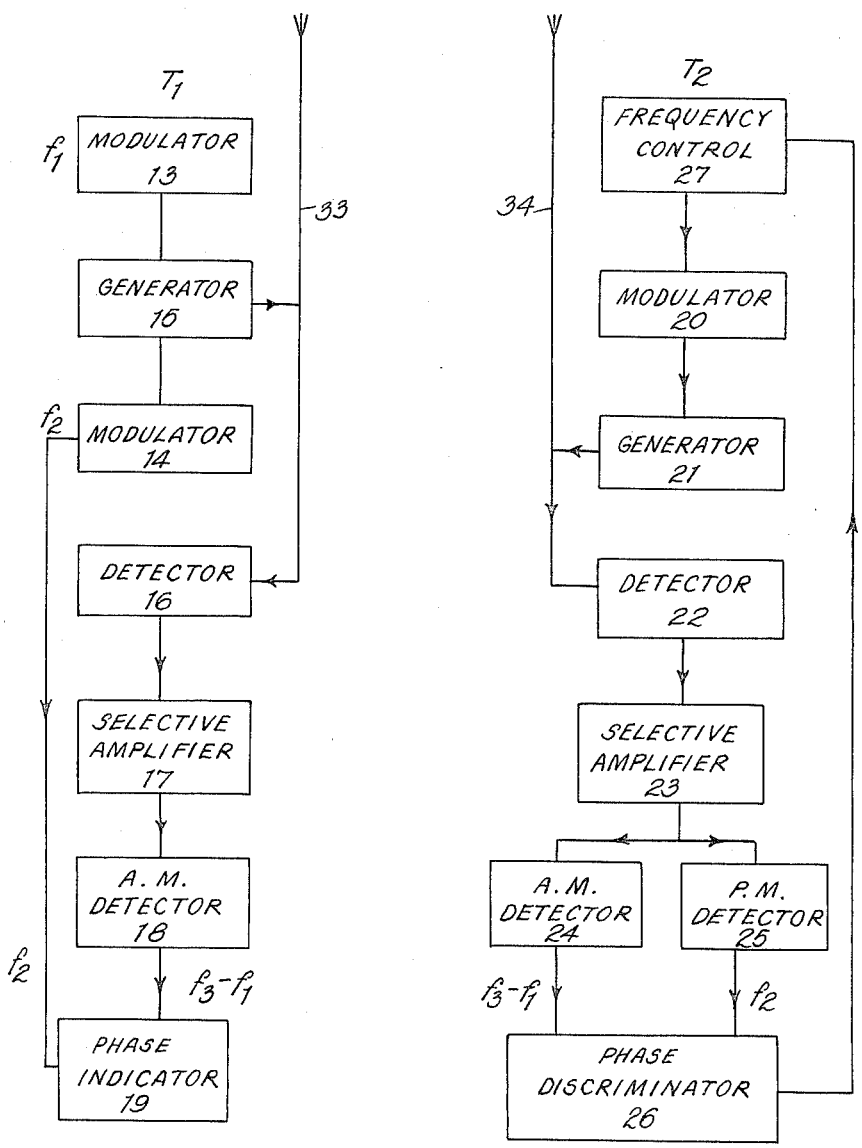

3,229,285
DETERMINING RELATIVE POSITION BY MEANS OF THE TRANSIT TIME OF WAVES
Trevor Lloyd Wadley, Johannesburg, Transvaal, Republic of South Africa, assignor to South African Council for Scientific and Industrial Research, Pretoria, Transvaal, Republic of South Africa
Filed May 15, 1963, Ser. No. 280,646
14 Claims. (Cl. 343—12)

This invention relates to the determination of the distance between two spaced points by means of electromagnetic and preferably radio frequency waves travelling between these points and is a continuation-in-part of United States Patent application Serial No. 35,974 filed on June 14, 1960 now abandoned.

In such systems using continuous waves, reception and/or transmission of the waves may take place at or from two or more points in such a manner as to give phase indications related to the relative position of the points. The frequencies and wavelengths to which such phase indications are directly related may be referred to as pattern frequencies and pattern wavelengths. These pattern frequencies arise from the physical transmission of waves of frequencies which may be referred to as measuring frequencies, some arithmetic combination of which gives the pattern frequencies. The frequencies at which phase indications are derived may be referred to as comparison frequencies and are related to the measuring frequencies being some other arithmetic combination of the measuring frequencies.

In previously known or proposed systems it has always been necessary to transmit one comparison frequency between the two points so that a comparison frequency or beat frequency has to be processed and transmitted and received and processed along with the measuring frequencies.

An object of the invention is to provide a system of the kind in question in which only measuring frequencies are transmitted between the points and comparison frequencies are not transmitted except for cases where a measuring frequency is itself a comparison frequency while using only three measuring frequencies the frequency of one of which is controlled to keep a predetermined frequency and phase relationship. Of course, the measuring frequencies may be transmitted as such or as modulations on carrier waves which play no part in the measuring processes.

Other objects and advantages of the invention will be apparent from the following description with reference to the accompanying drawings, in which FIGURE 1 is a block diagram of one preferred embodiment of the invention;

FIGURE 2 is a block diagram of a second preferred embodiment; and

FIGURE 3 is a circuit showing one possible form of phase discriminator 11 as used in FIGURE 1.

In both embodiments the points, the distance between which is to be measured, are indicated by T1 and T2. In fact the distance between aerial systems 33 and 34, which are common to both transmitting and receiving functions, is the one to be measured.

Depending on the design requirements the aerial systems 33 and 34 may be directive or non-directive. In some cases a standard duplexer is quite suitable.

In the first embodiment three radio frequencies $f1$, $f2$ and $f3$ are employed. These three frequencies occupy the same radio frequency channel in the sense that they can coexist as radio frequencies in the equipment chosen to perform the functions described later on. Many numerical frequencies are possible depending on the design chosen and legal requirements. Thus $f1$ could conveniently be 2999 mc./s. $f2$ could be 2002 mc./s. and $f3$ could be 3000 mc./s. From the numerical example it follows that the chosen frequency relationship is that $$(f2-f3)=2(f3-f1) \qquad (1)$$

In FIGURE 1 the measuring frequencies are carrier frequencies $f1$ and $f2$ generated by generators 1 and 2 at T1 and $f3$ generated by generator 8 at T2 respectively. Any generator suitable for generating the frequency that has been chosen or allotted may be used. For the numerical values given above a stabilised klystron has been found satisfactory.

At T2 there is a detector 9 which detects the difference frequencies $(f3-f1)$ and $(f2-f3)$ which are the comparison frequencies from the frequencies $f1$ and $f2$ received by the aerial system 34 and $f3$ fed to it from the generator 8. The detected comparison frequencies are amplified by a common amplifier 10 and fed to a phase discriminator 11 designed to produce an output which is a function of the phase of a fundamental frequency (in this case $f3-f1$) relative to its second harmonic frequency (in this case $f2-f3$).

A basic form of such a discriminator is illustrated in FIGURE 3 in which two rectifiers 40 and 41, associated with condensers 42 and 43 respectively and resistors 44 are connected as shown. If an alternating voltage is applied to the input of the circuit the condenser 42 will charge (through the rectifier 40) on the positive half cycle of the voltage and the condenser 43 will charge (through the rectifier 41) on the negative half cycle. There will be no output from the circuit in the event of both condensers being charged to the same potential, but when the charges across the two condensers differ there will be an output.

Now it is well known that the combined wave form of a fundamental frequency and its second harmonic frequency will have positive and negative peaks of equal magnitude when the two frequencies are in phase at some stage, and of unequal magnitude when the two frequencies are never in phase.

Therefore the circuit of FIGURE 3 will give an output when the combined wave form of frequencies of $(f3-f1)$ and $(f2-f3)$ has positive and negative peaks of unequal magnitude and zero output when the peaks are of equal magnitude. As soon as there is an output from the circuit this output voltage is applied to a frequency control unit 27 which controls the frequency and phase of $f3$. The frequency control unit 27 may be a reactance tube network but any circuit which can control the frequency of a frequency generator on the application of a control voltage will suffice. The frequency and phase of $f3$ is therefore adjusted until there is no output from the circuit at which stage $(f2-f3)=2(f3-f1)$ and the two frequencies are in phase at some stage.

The result is that $f3$ as transmitted by the aerial 34 is so controlled during transmission that Equation 1 is satisfied.

At the other point T1, a similar detection takes place at the detector 3, which, like the detector 9, may take the form of any non-linear impedance device such as a diode or a heterodyning detector. In this case comparison frequencies $f3-f1$ and $f2-f3$ are detected from the frequency $f3$ as received by the aerial system 33 and frequencies $f1$ and $f2$ as fed to it from the generators 1 and 2. The comparison frequencies are amplified by a common amplifier 4 and separated by filters 5 and 6.

The separated comparison frequencies are applied to a phase indicating device 7.

In a simple application, the device 7 may be of the type described with reference to the numeral 11 at point T2.

The reading obtained from the phase indicator 7 is a phase angle which is related to the distance between the points T1 and T2 and a frequency, called the pattern frequency, of $3f3$. This may be illustrated mathematically in the following manner:

The wave received at T1 is $f3$

Let $$f_3 = e_3 \sin 2\pi f_3 \left( t - \frac{T1T2}{C} \right)$$

where

T1T2 is the distance between points T1 and T2, and $C$ = velocity of light.

The waves generated at T1 are $f1$ and $f2$.

Let $$f_1 = e_1 \sin 2\pi f_1 t$$

and $$f_2 = e_2 \sin 2\pi f_2 t$$

The beats derived at T1 are $(f_3-f_1)$ and $(f_2-f_3)$ $$f_3 - f_1 = E_1 \sin \left[ 2\pi f_3 \left( t - \frac{T1T2}{C} \right) - 2\pi f_1 t \right] \quad (1)$$

$$f_2 - f_3 = E_2 \sin \left[ 2\pi f_2 t - 2\pi f_3 \left( t - \frac{T1T2}{C} \right) \right] \quad (2)$$

The phase angle measured by the indicator 7 is the angle between these beats. Let this be $\theta$.

(It must be borne in mind that $(f_2-f_3) = 2(f_3-f_1)$).

$$\theta = 2\pi f_2 t - 2\pi f_3 \left( t - \frac{T1T2}{C} \right) - 4\pi f_3 \left( t - \frac{T1T2}{C} \right) + 4\pi f_1 t$$

$$= 2\pi f_2 t - 2\pi f_3 t + 2\pi f_3 \frac{T1T2}{C} - 4\pi f_3 t + 4\pi f_3 \frac{T1T2}{C} + 4\pi f_1 t$$

$$= 2\pi \left[ f_2 t - f_3 t + f_3 \frac{T1T2}{C} - 2f_3 t + 2f_3 \frac{T1T2}{C} + 2f_1 t \right]$$

$$= 2\pi \left[ f_2 t - 3f_3 t + 3f_3 \frac{T1T2}{C} + 2f_1 t \right]$$

$$= 2\pi \left[ t(f_2-f_3) - 2t(f_3-f_1) + 3f_3 \frac{T1T2}{C} \right]$$

But $(f_2-f_3) = 2(f_3-f_1)$ $$\therefore \theta = 2\pi \left[ 3f_3 \frac{T1T2}{C} \right]$$

$$= \frac{2\pi T1T2}{C}(3f_3)$$

Thus the reading on the phase indicator gives a measure of the distance between points T1 and T2.

In the second embodiment of FIGURE 2 the measuring frequencies are modulation frequencies, e.g. $f1$ may be 9.999 mc./s. $f2$ may be 100 cycles per second and $f3$ may be 10 mc./s. The values of the carrier frequencies used are immaterial to the measuring process and may be chosen to suit design considerations and legal requirements.

The frequencies $f1$ and $f2$ are modulated by modulators 13 and 14 on the carrier generator 15 at T1, e.g. transmitting a carrier wave at 3000 mc., and at T2 a modulator 20 modulates the carrier generator 21, e.g. transmitting a carrier wave at 3033 mc., at a frequency $f3$. The modulators 13, 14 and 20 are preferably frequency modulators so that the modulations $f1$, $f2$ and $f3$ are frequency modulations. The carrier generators may conveniently be klystrons.

The modulations $f1$, $f2$ and $f3$ are of a similar frequency order which is greater than the bandpass of selective amplifiers 17 and 23, the function of which is to be described later on. The centre frequency of the selective amplifiers 17 and 23 of the selective amplifiers is chosen to be more or less equal to the difference frequency of the carrier generators 15 and 21. The measuring frequency $f2$ is a relatively low order of frequency less than the bandpass of the selective amplifiers 17 and 23.

At point T1 modulations $f1$ and $f2$ are transmitted on their carrier frequency by means of the aerial system 33. The aerial system 34 at point T2 receives the carrier which is fed with the carrier from the generator 21 to a detector 22 which may for example be a diode detector. At the same time the aerial system 33 at point T1 receives the carrier modulated at $f3$ and feeds it together with the locally generated carrier to a similar detector 16.

As a result of the intermodulation of the modulated carriers at the detectors 16 and 22 respectively, the outputs of which are fed to the selective amplifiers 17 and 23, the outputs of the selective amplifiers are the difference frequency of the carrier waves amplitude modulated by the difference frequency $f3-f1$ in each case. The comparison frequency $f3-f1$ is detected by A.M. detectors 18 and 24 respectively. In the case of the output of the selective amplifier 23 at point T2 the modulation frequency $f2$ is also detected by a frequency modulation detector 25, which may be any suitable frequency discriminator. The detectors 16 and 22 may conveniently be diode detectors.

In the case of the second example the predetermined frequency relationship is that $$(f3-f1) = f2 \quad (2)$$

The outputs of the detectors 24 and 25 are fed to a phase discriminator 26 which develops a control voltage when Equation 2 is not satisfied. The control voltage is fed to a frequency control device 27, e.g. a varactor diode which controls the frequency $f3$ of the modulator 20 so as to ensure that Equation 2 is satisfied.

At the point T1 the comparison frequency $f3-f1$ from the detector 18 is compared in phase with the frequency $f2$ from the modulator 14 by means of the phase indicator 19. Any suitable phase indicator of various well known types may be used. Thus a null-type indicator has been found satisfactory and direct reading oscilloscope type indicators have also been used with success. Other standard type indicators may also be used.

From Equation 2 and the comparison process it can be shown in a manner similar to that described in the first embodiment that the pattern frequency in this case is $f3$ which equals $f1+f2$, and that the reading on the phase indicator 19 gives a measure of the distance between points T1 and T2.

Ambiguous phase indications may be resolved by providing a number of different values for $f1$ and $f3$ while retaining $f2$ constant. Ambiguity resolution of this kind is well known and needs no further explanation.

In both embodiments the measuring frequencies may be placed in a different order of ascending magnitude. In the particular examples given the senses of the differences shown are intended to refer only to a particular example, i.e. $(f2-f1)$ implies that $f2$ is of a higher order of frequency than $f1$ but this is not intended to be restrictive in that $f1$ may be higher than $f2$ in an alternative of the determined frequency relationship.

It should be noted that in both embodiments comparison frequencies are detected at the points T1 and T2 but that these comparison frequencies are not transmitted. Furthermore, in each case only three measuring frequencies are used.

I claim:

1. A method of providing a measure of the distance between two spaced points consisting in generating at, and radiating from, the first point a first and second measuring frequency each as a component of an electromagnetic wave; generating at and radiating from the second point a third measuring frequency also as a component of an electromagnetic wave; at the second point receiving the wave or waves containing the first and second measuring frequencies detecting from the waves received and generated at that point a first comparison frequency which is the difference between the first and third measuring frequencies, detecting from the same waves a second comparison frequency which is the second measuring frequency or the difference frequency between the second measuring frequency and the third measuring frequency, testing the relationship between the first and second comparison frequencies, deriving a control signal from the testing operation when the relationship between the comparison frequencies differs from a predetermined relationship, and employing the control signal so to control the generation of the third measuring frequency that the predetermined frequency relationship between the comparison frequencies is restored or established; and at the first point receiving the wave containing the third measuring frequency, from the wave received and generated at that point detecting the first and second comparison frequencies and comparing the phases of the comparison frequencies so detected to give a phase measurement which is a measure of the distance between the two points.

2. A method of providing a measure of the distance between two spaced points consisting in generating at and radiating from the first point a first and a second measuring frequency; generating at and radiating from the second point a third measuring frequency; at the second point receiving the first and second measuring frequencies, detecting from the frequencies received and generated at that point a first comparison frequency which is the difference frequency between the first and third measuring frequencies, detecting a second comparison frequency which is the difference frequency between the second measuring frequency and the third measuring frequency, testing the relationship between the first and second comparison frequencies, deriving a control signal from the testing operation when the relationship between the comparison frequencies differs from a predetermined relationship and employing the control signal so to control the generation of the third measuring frequency that the predetermined frequency relationship is restored or established; and at the first point receiving the third measuring frequency, from the frequencies received and generated at that point detecting a third comparison frequency which is the difference frequency between the first and third measuring frequencies and a fourth comparison frequency which is the difference frequency between the second and third measuring frequencies, the third and fourth comparison frequencies corresponding to the first and second comparison frequencies respectively, and comparing the phases of the comparison frequencies so detected to give a phase measurement which is a measure of the distance between the two points.

3. A method of providing a measure of the distance between two spaced points consisting in generating and radiating a first carrier frequency from the first point; at the same point modulating the first carrier frequency by a first measuring frequency, modulating the first carrier frequency by a second measuring frequency; at the second point generating and radiating a second carrier frequency, modulating the second carrier frequency by a third measuring frequency, receiving the first modulated carrier frequency, detecting a first comparison frequency which is the difference frequency between the first and third measuring frequencies, detecting a second comparison frequency which is the second measuring frequency, testing the relationship between the first and second comparison frequencies, deriving a control signal from the testing operation when the relationship between the comparison frequencies differs from a predetermined relationship and employing the control signal so to control the generation of the third measuring frequency that the predetermined frequency relationship between the comparison frequencies is restored or established; and at the first point receiving the second modulated carrier frequency, from the frequencies received and transmitted at that point detecting a third comparison frequency which is the difference frequency between the first and third measuring frequencies and a fourth comparison frequency which is the third measuring frequency, the third and fourth comparison frequencies corresponding to the first and second comparison frequencies respectively, and comparing the phases of the comparison frequencies so detected to give a phase measurement which is a measure of the distance between the two points.

4. A system for providing a measure of the distance between two spaced points comprising free-running means to generate and radiate a first and a second measuring frequency at a first transmitting point, controlled means to generate and radiate a third measuring frequency at a second transmitting point; at the second transmitting point means to receive the first and second measuring frequencies; means for detecting a first comparison frequency which is the difference between the first and third measuring frequencies, means for detecting a second comparison frequency which is the second measuring frequency or the difference frequency between the second measuring frequency and the third measuring frequency, means to derive a control signal from the first and second comparison frequencies as detected at the second point and means so to apply the control signal to the means for generating the third measuring frequency as to establish a predetermined frequency relationship between the first and second comparison frequencies; and at the first point means to receive the third measuring frequency, means for detecting a third comparison frequency which is the difference between the first and third measuring frequencies, means for detecting a fourth comparison frequency which is the second measuring frequency or the difference frequency between the second measuring frequency and the third measuring frequency, the third and fourth comparison frequencies corresponding to the first and second comparison frequencies respectively, and means to compare the phases of the comparison frequencies so detected to give a measure of the distance between the two points.

5. A system for providing a measure of the distance between two spaced points comprising free-running means to generate and radiate a first and a second measuring frequency at a first transmitting point, controlled means to generate and radiate a third measuring frequency at a second transmitting point; at the second transmitting point means to receive the first and second measuring frequencies, means for detecting a first comparison frequency which is the difference between the first and third measuring frequencies, means for detecting a second comparison frequency which is the difference between the second and third measuring frequencies, means to derive a control signal from the first and second comparison frequencies as detected at the second point and means so to apply the control signal to the means for generating the third measuring frequency as to establish a predetermined frequency relationship between the first and second comparison frequencies; and at the first point means to receive the third measuring frequency, means for detecting a third comparison frequency which is the difference between the first and third measuring frequencies, means for detecting a fourth comparison frequency which is the second measuring frequency or the difference frequency between the second measuring frequency and the third measuring frequency, the third and fourth comparison frequencies corresponding to the first and second comparison frequencies respectively, and means to compare the phases of the comparison frequencies so detected to give a measure of the distance between the two points.

6. The system claimed in claim 5 in which the means to derive the control signal is a phase discriminator.

7. The system claimed in claim 6 in which the predetermined frequency relationship between the first and second comparison frequencies is that the one comparison frequency is double the other, and the frequency discriminator is designed to produce an output which is a function of the phase of a fundamental frequency relative to its second harmonic frequency.

8. The system claimed in claim 7 in which the discriminator consists in two opposed peak rectifiers each detecting the peak voltage of each polarity of a wave to give a zero output when the peaks of each polarity are equal.

9. The system claimed in claim 5 in which the predetermined frequency relationship between the first and second comparison frequencis is that the one comparison frequency is double the other, and the means to compare the phases of the comparison frequencies is a frequency discriminator designed to produce an output which is a function of the phase of a fundamental frequency relative to its second harmonic frequency.

10. The system claimed in claim 6 in which the discriminator consists in two opposed peak rectifiers each detecting the peak voltage of each polarity of a wave to give zero output when the peaks of each polarity are equal.

11. A system for providing a measure of the distance between two spaced points comprising free-running means to generate and radiate a first and a second measuring frequency at a first transmitting point, controlled means to generate and radiate a third measuring frequency at a second transmitting point; at the second transmitting point means to receive the first and second measuring frequencies, means for detecting a first comparison frequency which is the difference between the first and third measuring frequencies, means for detecting a second comparison frequency which is the difference between the second and third measuring frequencies, a phase discriminator consisting in two opposed peak rectifiers each detecting the peak voltage of each polarity of a wave to give a zero output when the peaks of each polarity are equal to derive a control signal from the first and second measuring frequencies as detected at the second point, and means so to apply the control signal to the means for generating the the third measuring frequency as to keep one comparison frequency double the other; and at the first point means to receive the third measuring frequency, means for detecting a third comparison frequency which is the difference between the first and third measuring frequencies, means for detecting a fourth comparison frequency which is the second measuring frequency or the difference frequency between the second measuring frequency and the third measuring frequency, the third and fourth comparison frequencies corresponding to the first and second comparison frequencies respectively, and a second phase discriminator for comparing the phases of the comparison frequencies so detected to give a measure of the distance between the two points.

12. A system for providing a measure of the distance between two spaced points comprising free-running means to generate and radiate a first and a second measuring frequency at a first point, controlled means to generate and radiate a third measuring frequency at a second point; at the second point means to receive the first and second measuring frequencies, means for detecting the difference frequency between the first and third measuring frequencies, means for detecting the second measuring frequency, means to derive a control signal from the difference frequency and the second measuring frequency as detected at the second point and means so to apply the control signal to the means for generating the third measuring frequency as to keep the difference frequency equal to the second measuring frequency; and at the first point means to receive the third measuring frequency, means to detect the difference frequency between the first measuring frequency as generated and the third measuring frequency as received, and means to compare the phases of the latter difference frequency and the second measuring frequency as generated to give a measure of the distance between the two points.

13. A system for providing a measure of the distance between two spaced points comprising means to generate and radiate a first carrier frequency at a first point, free-running means to modulate the first carrier wave by a first measuring frequency, free-running means to modulate the first carrier wave by a second measuring frequency, means to generate and radiate a second carrier frequency at a second point, means to modulate the second carrier frequency by a third measuring frequency, the first and third measuring frequencies being of a similar order of frequency and the second measuring frequency equal to their difference; at the second point means to receive the first carrier frequency, first detector means to heterodyne the modulated carrier waves together, first amplifying means to amplify the output of the detector means, the center frequency of the first amplifying means being equal to the difference frequency between the carrier frequencies and its bandpass being less than the first and third measuring frequencies and greater than the second measuring frequency, amplitude modulation detector means to detect the amplitude modulation of the output of the amplifying means, frequency modulation detector means to detect the second measuring frequency in the output of the amplifying means, means to derive a control signal from the outputs of the amplitude modulation detector means and the frequency modulation detector means, and means so to apply the control signal to the means for modulating the means for generating the second carrier frequency that the difference between the first and third measuring frequencies equals the second measuring frequency; and at the first point means to receive the second carrier frequency, second detector means to heterodyne the modulated carrier waves together, second amplifying means to amplify the output of the second detector means, the second amplifying means at the first point having the same characteristic as the amplifying means at the second point, second amplitude modulation detector means to detect the amplitude modulation of the output of the second amplifying means, and means to compare the phases of the latter amplitude modulation and the second measuring frequency to give a measure of the distance between the two points.

14. A system for providing a measure of the distance between two spaced points in which there is provided at a first point means to generate and radiate a first carrier frequency; at a second point means to generate and radiate a second carrier frequency; at the first point free-running means to generate a first and a second measuring frequency and frequency modulate them on the first carrier frequency; at the second point controlled means to generate a third measuring frequency and frequency modulate it on the second carrier frequency; at each point means to receive the modulated carrier radiated from the other point, heterodyne detector means to heterodyne the received modulated carrier frequency and the local modulated carrier frequency together, and means to amplify the output of the heterodyne detector means; the first and third measuring frequencies being of the same order, their difference being arranged to be the same as the second measuring frequency, the center frequency of each amplifying means being equal to the difference frequency between the carrier frequencies and the band pass of the amplifying means being less than the first and third measuring frequencies and greater than the second measuring frequency; also at each point means to detect the amplitude modulation of the output of the amplifying means as a comparison frequency; at the second point means to detect the second measuring frequency as a frequency modulation of the output of the amplifying means at that point, means to derive a control signal from the second measuring frequency thus detected and the comparison frequency detected at that point, and means so to apply the control signal to the means to generate the third measuring frequency as to keep the comparison frequency equal to the second measuring frequency; and at the first point means to compare the comparison frequency and the second measuring frequency as generated to give a measure of the distance between the two points.

No references cited.

CHESTER L. JUSTUS, *Primary Examiner.*